United States Patent [19]

Phipps

[11] 3,981,015

[45] Sept. 14, 1976

[54] PHASE LOCKING OF TIME-SEQUENTIAL TRANSMISSION FROM SPACED TRANSMITTERS IN A PHASE COMPARISON NAVIAGATION SYSTEM

[75] Inventor: Derek John Phipps, London, England

[73] Assignee: Decca Limited, London, England

[22] Filed: Nov. 15, 1974

[21] Appl. No.: 524,124

[30] Foreign Application Priority Data
Nov. 16, 1973 United Kingdom............... 53183/73

[52] U.S. Cl............................................ 343/105 R
[51] Int. Cl.²........................................... G01S 1/30
[58] Field of Search .................... 343/105 R, 103 R

[56] References Cited
UNITED STATES PATENTS
3,189,903    6/1965    White............................. 343/105 R Primary Examiner—Maynard R. Wilbur
Assistant Examiner—Richard E. Berger
Attorney, Agent, or Firm—Edward F. Connors

[57] ABSTRACT

In a phase comparison radio navigation system in which a prime and one or more secondary transmitting stations radiate phase-locked signals of the same frequency in a time-shared sequence, phase locking at the secondary station or stations is effected by using a common phase comparator both for locking a phase memory oscillator to the received prime signals and for locking the secondary signals at the antenna with the phase memory oscillator.

15 Claims, 6 Drawing Figures

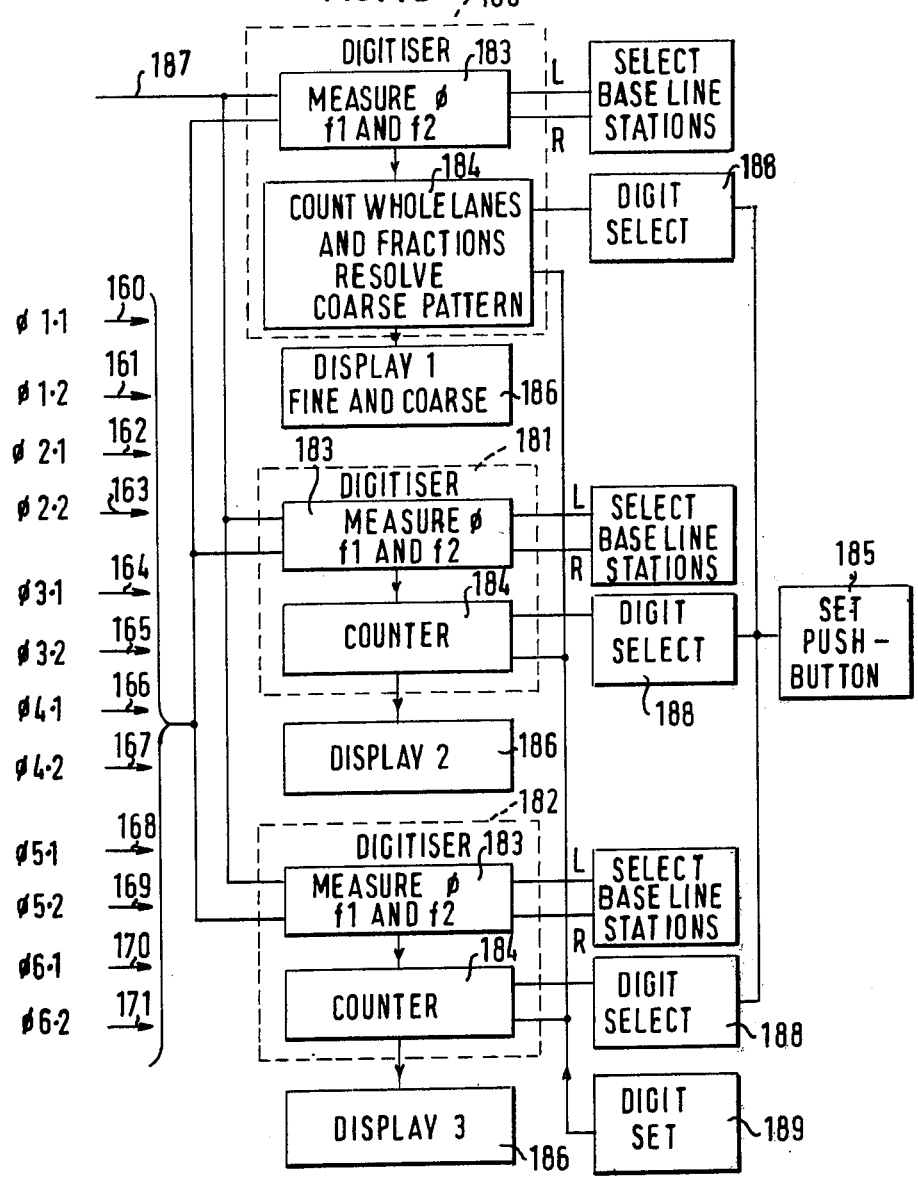

PHASE LOCKING OF TIME-SEQUENTIAL TRANSMISSION FROM SPACED TRANSMITTERS IN A PHASE COMPARISON NAVIAGATION SYSTEM

BACKGROUND OF THE INVENTION

1. Field of the Invention

This invention relates to phase comparison radio navigation systems of the kind in which spaced transmitting stations radiate phase-locked signals of the same frequency in a time shared sequence and in which, at a receiver, the signals from the spaced stations are compared in phase.

2. Prior Art

It is known in such a system to have one of the transmitting stations as a prime or master station and to provide the other transmitting stations, referred to as secondary or slave stations, with means for receiving signals from the prime station to determine or control the frequency and phase of the radiation from the secondary station. Heretofore, in such systems, the secondary stations have had a receiving antenna for receiving the signals from the prime station, an oscillator and a phase discriminator comparing the received prime signals with the oscillator output to maintain the oscillator in the required frequency and phase relation with the prime signals. The oscillator output is then used to drive a power amplifier feeding a transmitting antenna to provide the radiated secondary signals. A further phase discriminator and phase lock loop is provided to compare the phase of the radiated secondary signals with the oscillator output and to control a phase shifter for adjusting the phase of the radiated signals so as to compensate for any variations in phase shift between the oscillator and the antenna radiation. When separate receiving and transmitting antennae are employed in this way, it is possible for changes in ground conditions to modify the coupling between the antennae and hence to alter the relationship between the transmitted signals and the incoming datum.

SUMMARY OF THE INVENTION

According to the present invention in a phase comparison radio navigation system having a prime transmitting station and one or more secondary transmitting stations which are spaced apart and radiate phase-locked signals of the same frequency in a time shared sequence, the or each secondary station has a single antenna for both receiving the signals from the prime station and transmitting the secondary station signals, an oscillator to provide a prime signal phase memory, a phase discriminator comparing the phase of the signal at the antenna with the output of said oscillator to provide a phase control signal, a phase controller responsive to said phase control signal, and switching means controlled in synchronism with the transmissions from the prime station and from the secondary station at which the switching means are located, which switching means are operative, during periods of transmission from the prime station, to switch the phase controller to control the oscillator in accordance with the output of the phase discriminator so that the oscillator is phase-locked to the received signals, said switching means further being operative, during periods of transmission from the secondary station at which the switching means are located, to switch the phase controller to control the phase of the transmitted secondary signals at the antenna in accordance with the output of the phase discriminator.

The signal source for the secondary transmissions preferably includes a voltage controlled oscillator, referred to as the transmission oscillator, to distinguish it from the phase memory oscillator and the control of the phase of the transmitted secondary signals is thus effected by utilising the output of the phase discriminator, during the appropriate time periods, to control the frequency of this transmission oscillator.

With this arrangement, a single phase discriminator is employed which compares the phase of the signals at the antenna of the secondary station with the phase of the phase memory oscillator at that station. The circuit components between the antenna and the phase discriminator and between the oscillator and the phase discriminator remain in the same circuit both when the prime station is transmitting and when the secondary stations are transmitting. During transmissions from the prime station, this phase discriminator serves to provide a phase lock for the phase memory oscillator so that the oscillator at the or each secondary station is locked to the signals received from the prime station. During transmission from the secondary station, the same phase-lock discriminator is used in the same circuit to compare the signals at the antenna, which signals are in this case the radiated secondary station signals with the output of the oscillator. The phase of the secondary transmission is controlled now by the phase-lock discriminator to maintain it in the appropriate phase relationship with the oscillator, e.g. by controlling the frequency of the transmission oscillator from the discriminator output. It will be noted that a single antenna is employed. This arrangement therefore avoids any problems such as have arisen heretofore because of changes in coupling between the receiving and transmitting antennae and also avoids problems of differential phase shifts in different circuits in the transmitting station.

It is preferable to make the memory oscillator at the secondary station, which will be referred to hereinafter as the prime phase memory oscillator, to have a frequency very much greater than the radio frequencies employed. For example in a system operating at radio frequencies in a band of 1600 to 5000 kHz, the oscillator might conveniently be made to operate at 10 MHz. Using such a higher frequency oscillator, a divider may be provided to divide down the oscillator frequency to a comparison frequency for use in the phase discriminator circuit, typically 100 kHz with the above frequencies, and the oscillator may provide the frequency source for a frequency synthesiser to give a heterodyne signal for changing the frequency of the signals from the antenna to the aforementioned comparison frequency. By using a switched frequency synthesiser, it is readily possible to provide an output of any selected frequency in steps which are sub-multiples of the oscillator frequency, for example in steps of 100 Hz, and the frequency synthesiser can be set to give an appropriate frequency derived from the oscillator frequency for heterodyning the received signals by the required input to the phase discriminator. It will be borne in mind that the oscillator is phase-locked to the received signals from the prime station. The oscillator frequency is thus necessarily fixed in relation to the prime station frequency and thus steps in the form of sub-multiples of the oscillator frequency can be used to heterodyne received signals from the prime station to bring them to a frequency which is the sub-multiple of the oscillator frequency fed to the phase-lock discriminator.

The transmission oscillator may operate at the same frequency as the phase memory oscillator, the synthesised output being used as a heterodyne signal to produce the required radiation frequency.

The use of a heterodyne system as described above with a frequency synthesiser has a further very important advantage in that the frequency synthesising means may readily be arranged to provide two or more different frequencies which are all multiples of the aforementioned frequency step and which are derived from a single oscillator locked to received signals from the prime station. The prime station and each of the secondary stations may have such further frequency synthesisers and it is thus possible for the stations of the system to transmit on a number of different frequencies. These transmissions are most conveniently on a time-shared basis.

In a phase comparison radio navigation system operating in a circular mode, the spacing between the stations changes with movement of the craft or vehicle carrying one of the transmitters. The phase memory oscillator takes account of this, the frequency changing in accordance with changes in doppler frequency changes. If two different frequencies are employed, the doppler shifts will differ and therefore preferably at each secondary station there is provided a separate phase memory oscillator for each further frequency radiated from the prime station in addition to the first frequency and the aforementioned phase discriminator is switched, during periods of transmission from the prime station on any further frequency, to control the appropriate further oscillator and, during transmissions from the secondary station on that further frequency, to control the radiated phase in accordance with a phase comparison in the phase discriminator of the appropriate further oscillator output with the transmitted signals at the antenna. It will be noted that, in such a time-shared system, a signal phase-lock discriminator is still employed even in a multi-frequency system.

By using, as described above, an oscillator with a frequency divider to provide one of the inputs to the phase discriminator, it is readily possible to introduce digital phase shift into that input of the phase discriminator in steps corresponding to fractions of a cycle, the number of steps in the cycle corresponding to the divider ratio. Thus, if a 10 MHz oscillator is employed with 100:1 frequency divider, it is readily possible to have a digital phase shifter with 100 steps per cycle. Such a digital phase shifter is highly accurate and can readily be set to any specific step without problems of drift in settings. By using digital phase shifters in this way, phase shifts can be introduced into the secondary station transmissions relative to the received prime station signals as required to give any desired phase relation.

The aforementioned further oscillator are preferably arranged to operate at the same frequency as the first oscillator, apart from the different doppler shifts due to any relative movement between the transmitting stations. The frequency synthesising means, conveniently separate frequency synthesisers for each frequency, are each driven from the first oscillator that is to say the oscillator locked to the received signals from the prime station at the first frequency but provide the appropriate heterodyne inputs for heterodyning the signals from the antenna to give the required input frequency to the phase discriminator. The reason for using a second phase memory for the separate frequency is to provide the required doppler corrected heterodyne signal for mixing with the synthesiser output if the secondary station is moving relative to the prime station.

In the secondary station, for transmitting signals of each frequency on a time-shared basis there may be provided a common power amplifier together with separate transmission oscillators for each frequency to be transmitted, which transmission oscillators are preferably at the same frequencies as the aforementioned phase memory oscillators and a divider for each transmission oscillator together with a balanced modulator for combining the divider output with the output from the appropriate synthesiser to give the required frequency, the transmission oscillators being controlled by the output of the aforementioned phase discriminator during the appropriate time periods so as to provide the required phase control of the radiated signal.

The output from the power amplifier may be fed to the antenna through a matching unit which ensures the necessary attenuation of the input to the receiving channel during periods of transmission. This matching unit conveniently includes a relay switched during periods of transmission to provide a high impedance in the circuit to the receiving channel.

BRIEF DESCRIPTION OF THE DRAWINGS

FIGS. 4A and 4B together are a block diagram illustrating a receiver.

DESCRIPTION OF THE PREFERRED EMBODIMENT

Figure 1:
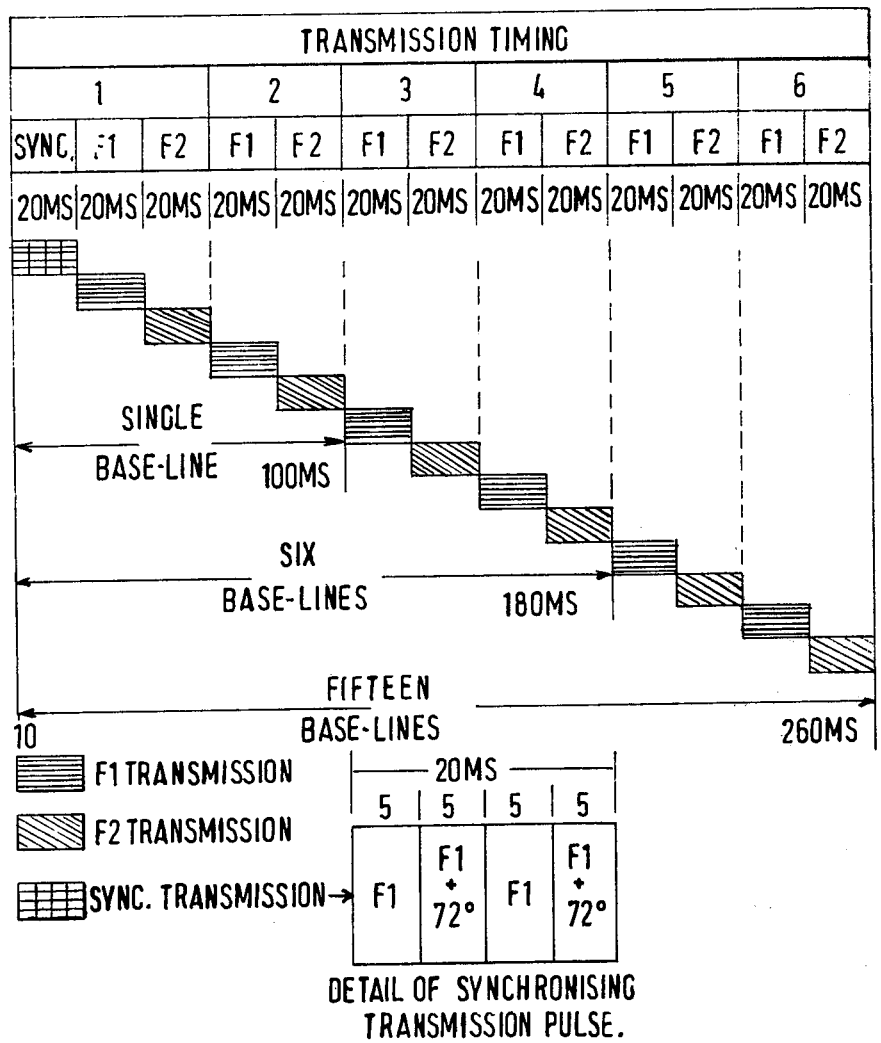
FIG. 1 is a timing diagram illustrating the timing of transmissions from a number of transmitting stations of a phase comparison radio navigation system.

The particular navigation system to be described with reference to the drawings has a prime transmitting station which radiates a synchronising signal for a period of 20 milliseconds followed by a transmission at a frequency $f1$ for 20 milliseconds and then a frequency $f2$ for 20 milliseconds. Each of the secondary stations radiates the frequency $f1$ for 20 milliseconds followed by $f2$ for 20 milliseconds. The timing cycle permits of up to five secondary stations. With one secondary station only, the system will provide position line information. A single set of position lines is used in some circumstances; for example a single set of concentric position lines may be employed for a sea-search. The two stations might be used as fixed stations with a receiver on a vehicle so that the two stations form the base line of a single hyperbolic pattern or one of the stations may be on a vehicle so that the system gives range information. More generally two or more secondary stations would be used to give a position fix. Any pair of stations can form the base line of a pattern of position lines if, as in one form of receiver, means are provided for comparing the phase of any two received signals of the same frequency. Thus, in a hyperbolic navigation system, four stations can provide six sets of hyperbolic position lines while six stations can provide fifteen sets of hyperbolic position lines.

With a single frequency, the system can be arranged as a multi-user hyperbolic system with between three and six stations according to the coverage required or to provide two circular patterns for up to four users. By employing two or three secondary stations depending on the area to be covered, multi-user position fixing is provided and further secondary stations can be used for giving circular patterns for individual users, thereby providing for operation in both hyperbolic and circular modes together.

The two frequencies $f1$ and $f2$, in this embodiment are in the range of 1600 to 5000 kHz. Use of one frequency only provides accurate positional information but, as is well known, ambiguities arise. The second frequency $f2$ is made a small percentage less than $f1$ and the difference between phase angle determinations at frequencies $f2$ and $f2$ provides a coarse pattern of position lines for resolving these ambiguities. With circular patterns, the second frequency may be employed by further users if coarse information is unnecessary.

The frequencies $f1$ and $f2$ need not be harmonically related. As will be described later, each of these frequencies may be separately selected from frequency synthesisers providing frequencies in 100Hz steps. Conveniently the two frequencies differ by multiples of 100Hz.

The synchronising transmission from the prime station is used for controlling timing of the secondary station transmissions and also in the receiver. The synchronising transmission comprises a phase modulation, the phase of the $f1$ transmission being shifted by $+72°$ for two periods of 5 milliseconds during the 20 millisecond peroid of this transmission.

Figure 2:
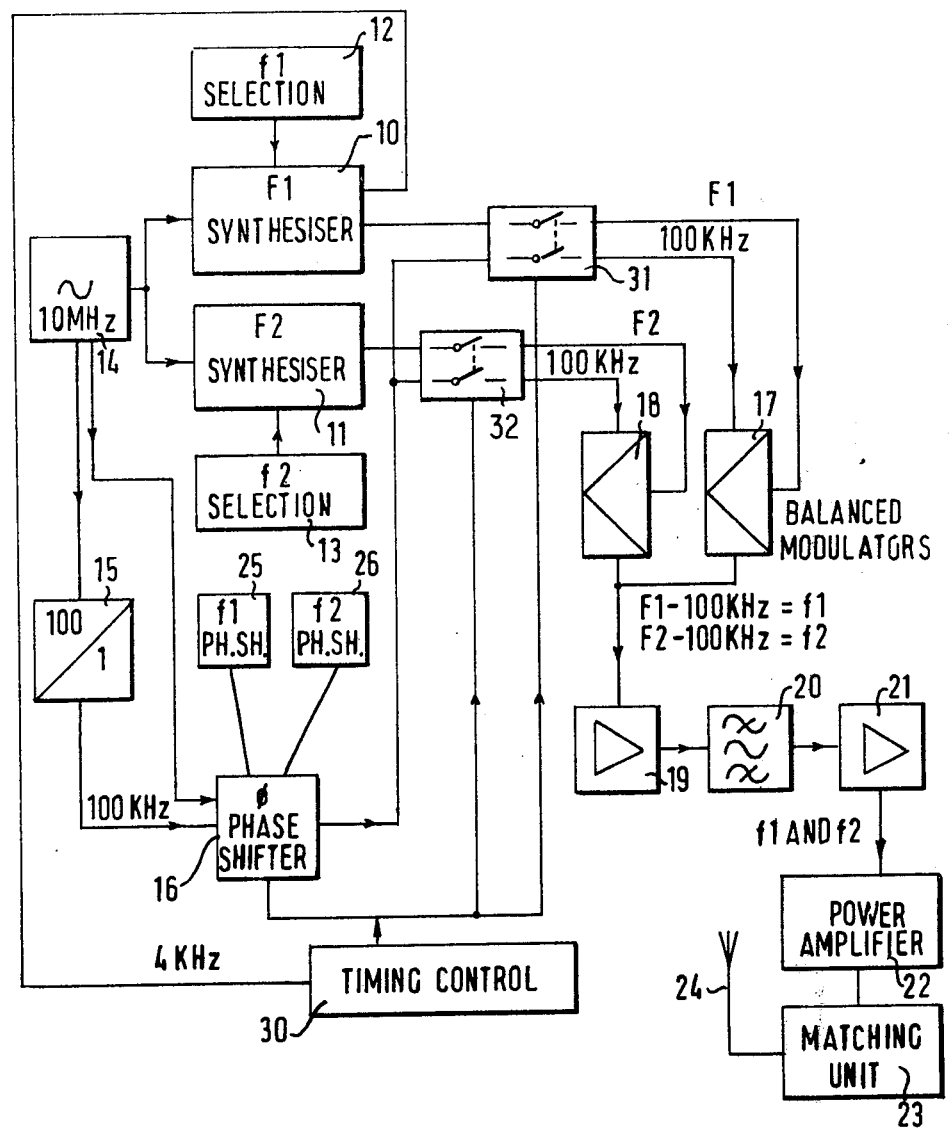
FIG. 2 is a block diagram illustrating a prime transmitting station.

The prime station, shown in FIG. 2, has frequency synthesisers 10, 11 for producing frequencies F1 and F2 respectively where $F1 = f1 + 100$ kHz and $F2 = f2 + 100$ kHz, the frequencies being selected by thumbwheel controls 12, 13 respectively in 100 Hz steps. A signal generator unit comprising a 10 MHz temperature-stabilised crystal-controlled oscillator 14 and a 100 to 1 frequency divider 15 provides a 10 MHz signal for the synthesisers 10, 11 and a 100 kHz signal which is fed via a phase shifting unit 16 to balanced modulators 17, 18 where the 100 kHz signal is combined with the F1 and F2 signals respectively from the frequency synthesisers 10, 11 to produce signals of frequencies $f1$ and $f2$. Narrow band filters are provided in the 100 kHz inputs to both balanced modulators 17, 18 in order to avoid second harmonic breakthrough and to shape the transient introduced by the phase modulation. The output signals from the two balanced modulators 17, 18 are amplified by an amplifier 19, passed through a filter 20 and further amplified at 21 before being fed to a power amplifier 22 to provide signals which are fed via an antenna matching unit 23 to an antenna 24. The phase shift unit 16 includes separate controls 25, 26 for digital switched phase shifting of the $f1$ and $f2$ transmissions. A 10 MHz input from the oscillator 14 to the phase shift unit 16 enables the phase shifting to be controlled digitally in steps of 1/100th of a cycle.

The two frequency synthesisers 10, 11 enable selection of the frequencies F1 and F2 to be made independently; each frequency can be selected in 100 Hz steps. The synthesiser 10 also provides a 4 kHz signal which is fed to a timing control unit 30 controlling the timing cycle.

Outputs from the timing control unit 30 are applied to electronic switches 31, 32 which control respectively the inputs to the balanced modulators 17, 18. The switch 31 is closed during the synchronising period and during the periods of transmissions at frequency $f1$ whilst the switch 32 is closed during the periods of transmission of frequency $f2$. The timing control unit 30 also applies a signal to the phase shifter 24 during the synchronising transmissions to introduce the 72° phase shift for two peroids of 5 milliseconds in each synchronising transmission.

Figure 3A:
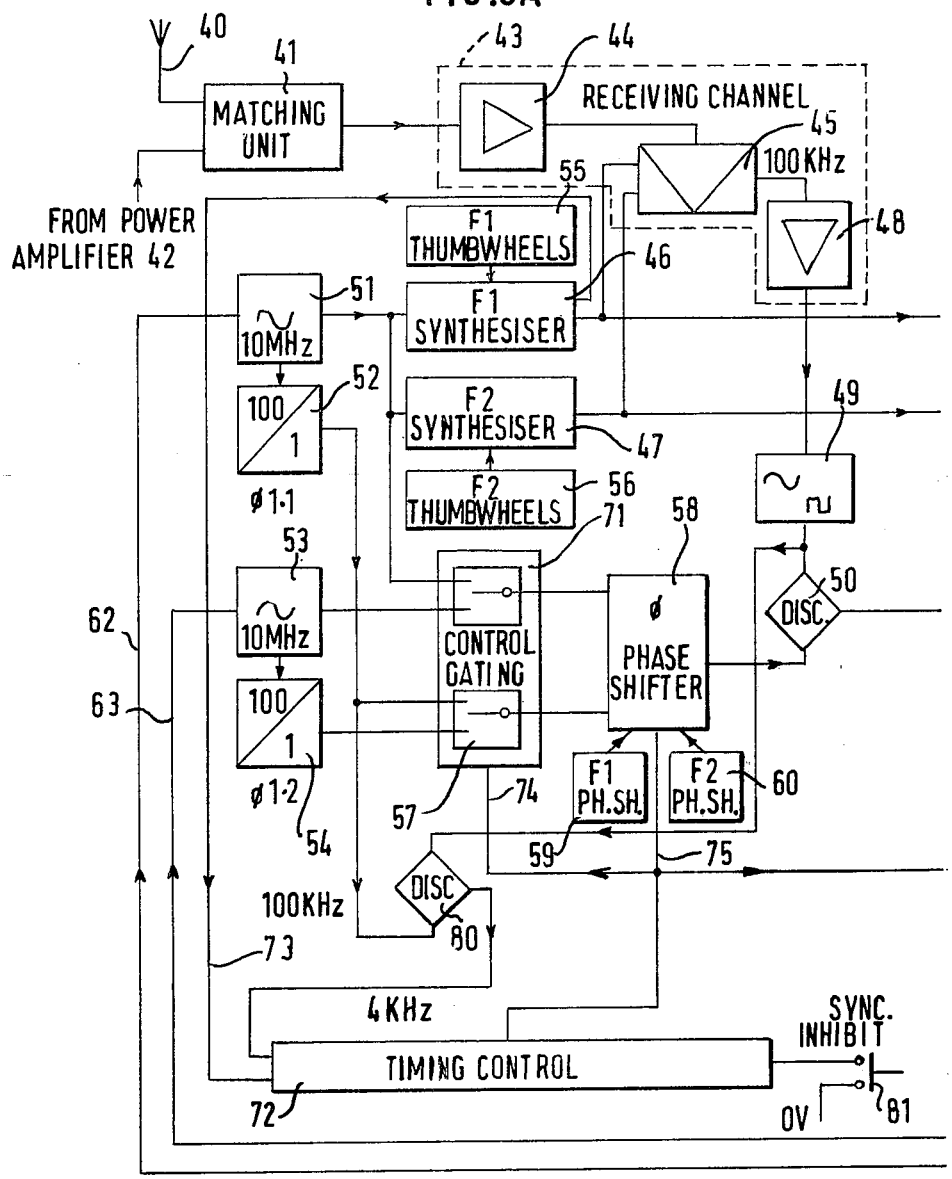
FIGS. 3A and 3B together are a block diagram illustrating one of the secondary transmitting stations.
Figure 3B:
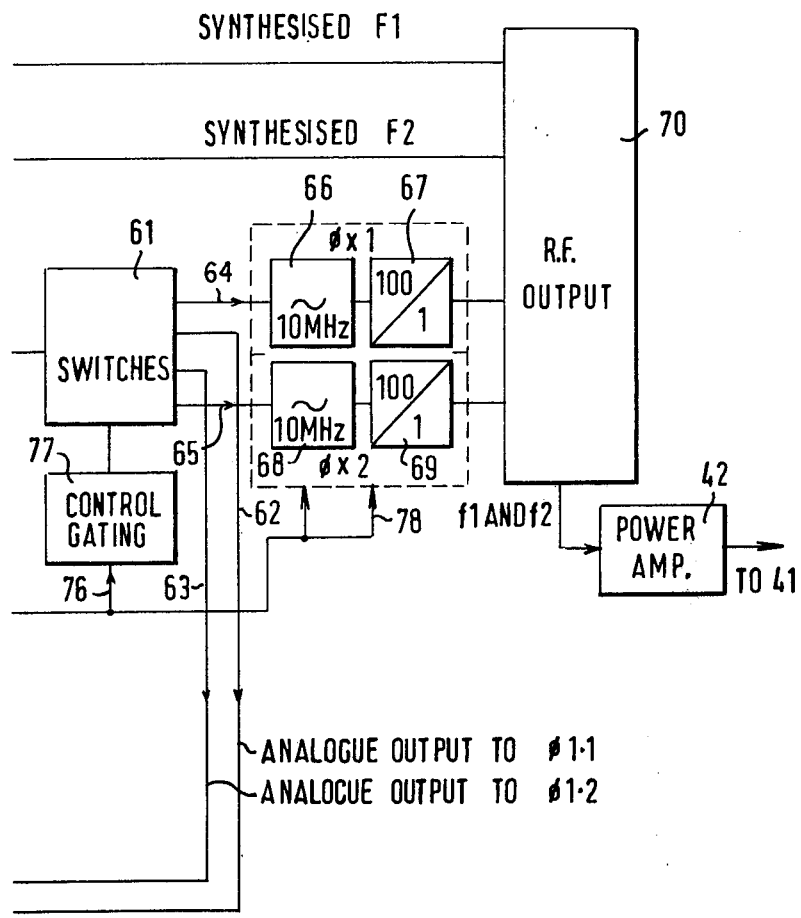

FIGS. 3A and 3B together illustrate in block diagram form a secondary transmitter. This transmitter has an antenna 40 which is coupled via a matching unit 41 both to a power amplifier 42 for transmission and to a receiver unit 43 for reception. The receiver unit 43 includes a broad band amplifier 44 feeding a mixer unit 45 where the receiver signals are heterodyned with signals of frequencies F1 and F2 from frequency synthesisers 46, 47 respectively to provide an output at 100 kHz to an amplifier 48. The sinusoidal output from the amplifier 48 is passed through a squarer 49 to a phase discriminator 50 where it is compared, during appropriate time periods, with one or other of the 100 kHz signals from two local signal generators referred to hereinafter as the $\phi 1.1$ and $\phi 1.2$ signal generators. The $\phi 1.1$ signal generator comprises a 10 MHz varactor controlled oscillator 51 and a 100 to 1 frequency divider 52. Similarly the $\phi 1.2$ signal generator comprises a 10 MHz varactor controlled oscillator 53 and a 100 to 1 frequency divider 54. These two signal generators are frequency and phased-locked as will hereinafter be described, to the received $f1$ and $f2$ transmissions respectively. During the period of transmissions from the prime station, the $f1$ and $f2$ received signals are the signals received from the prime station. When the secondary station is transmitting, the output from the power amplifier 42 fed to the antenna 40 provides, from the matching unit 41, received signals which are compared by the discriminator with the outputs of the $\phi 1.1$ and $\phi 1.2$ signal generators. The 10 MHz oscillator 51 provides a signal of that frequency not only to the frequency divider 52 but also to the F1 synthesiser 46 and to the F2 synthesiser 47. These synthesisers 46, 47 have thumbwheel controls 55, 56 respectively permitting of selection of any frequency in the required bandwidth in steps of 100 Hz.

The outputs of the 100 to 1 dividers 52, 54 are fed to a control switch 57 enabling selection of one or other of these two 100 kHz signals for application via a phase shifter 58 to the aforementioned phase discriminator 50. The phase shifter 58 has timing control for a timing control unit 72 and includes manually adjustable control means 59, 60 for adjusting respectively the phase shift during the transmissions from the secondary station at frequencies $f1$ and $f2$.

The output from the phase discriminator 50 representative of the phase difference of its two inputs is applied to a switching unit 61 which switching unit causes this control signal from discriminator 50 to be applied at the appropriate times to the appropriate one of four separate output leads, the switching unit 61 being controlled for this purpose by the timing control unit 72. Two of these leads 62, 63 apply the analogue output from the phase discriminator 50 respectively to the 10 MHz oscillators 51, 53 as frequency control inputs for frequency and phase locking of the $\phi 1.1$ and $\phi 1.2$ signal generators to the received signals from the prime station. The other two outputs from the switching unit 61 on leads 64, 65 are applied respectively to two further signal generators, referred to hereinafter as the φ×1 and φ×2 signal generators which constitute the signal sources used for transmissions from the secondary station during the periods of transmission on frequencies $f1$ and $f2$ respectively. The φ×1 signal generator comprises a varactor controlled 10 MHz oscillator 66 and a 100 to 1 frequency divider 67 whilst the φ×2 signal source comprises a varactor controlled 10 MHz signal generator 68 and a 100 to 1 frequency divider 69. The 100 kHz outputs from the dividers 67, 69 are fed to a radio frequency output unit 70 to which are also fed the synthesised F1 and F2 frequencies from the synthesisers 46, 47. The RF unit 70 is identical with the RF unit in the prime transmitter (comprising switches 31, 32 balanced modulators 17, 18, amplifier 19, filter 20 and further amplifier 21) and provides the required outputs at frequencies $f1$ and $f2$ to the power amplifier 42.

The phase shifter 58 is a digital phase shifter and, in order to enable the controls 59, 60 to give steps of phase of 100th of a cycle, it requires an input signal at exactly 100 times the frequency of the signal being controlled. These inputs are provided directly from the aforementioned oscillators 51, 53 via a switch 71.

Timing of the operation of the various switches is controlled by the aforementioned timing control unit 72 which has a 4 kHz input on lead 73 from the synthesiser 46. This timing control unit provides outputs at 74 to control the aforementioned switches 57, 71 for selecting inputs to the phase discriminator 58 during the appropriate period. It also provides a control signal on a lead 75 to the phase shifter 58 for selection of the appropriate phase shift from the manual controls 59, 60. On a lead 76, the timing control unit 72 provides a signal to a gating control 77 controlling the switching unit 61 for selection of the appropriate leads to which the output of the phase discriminator 50 is to be fed. The timing control unit also provides signals on leads 78 to the RF output unit 70 for controlling the switches therein corresponding to the switches 31, 32 of FIG. 2.

The cyclic sequence of the timing control unit has to be initiated in synchronism with the cycle of transmissions from the prime station. To do this there is provided a synchronising discriminator unit 80 which includes, as will hereinafter be described, the necessary circuits to detect the phase modulation on the signals received from the prime station during the synchronising transmission and to generate from this the required timing pulse for initiating operation of the timing control unit. The timing control unit essentially is a counter providing outputs at appropriate time intervals after the initiating pulse. During the synchronising transmission from the prime station, the phase modulated signal is received at the secondary station on the antenna 40 and passes through the receiving channel 44, 45, 48 to give a phase modulated 100 kHz input to the squarer 49. The output from the squarer 49 is applied to one of the inputs of the synchronising discriminator 80, the other input being a 100 kHz reference input from the divider 52. The phase modulated input to the synchronising discriminator results in a square wave output from the synchronising discriminator 80. Before the secondary station is locked to transmissions from the prime station, there may be a few cycles difference between the intermediate frequency at amplifier 48 and the reference 100 kHz derived from the divider 52. However, between leading edges, the 5 millisecond wide synchronising phase shift pulses effectively are one cycle of a 100 Hz signal which, notwithstanding the possible few cycles out of lock, is detected by the synchronising discriminator and fed to a digital recognition circuit comprising a shift register clocked at 1 kHz pulse rate in the discriminator unit 80. The two 5 millisecond phase shift pulses are 10 milliseconds apart if measured either on their leading edges or their trailing edges. Conveniently the positive edges are selected, shaped and fed into this shift register which is arranged to detect when there are pulses 10 milliseconds apart to provide signals to an AND gate which generates the second and active edge of the trigger condition. Any random pulses occurring during a 10 millisecond correlation period inhibit the trigger function. Thus the synchronising detector unit 80 provides an output signal timed in accordance with the received synchronising transmission from the prime station. This signal is fed via a fast monostable to the reset line of the timing control 72 which latter consists of a modulo 80 divider for the 4 kHz input from the synthesiser 46 driving a shaft register generating the required 20 millisecond timing intervals. Thus, although at the commencement of the transmission of a chain, the local signal generators φ1.1 and φ1.2, which constitute phase memories for received signals, are not frequency and phase-locked to the received signals, chain timing is locked from the synchronising phase modulation on the $f1$ transmission from the prime station. The initial frequency difference between the intermediate frequency from the prime station $f1$ and the 100 kHz from the φ1.1 signal generator 51, 52 is not significant. The timing control unit 72 can thus now control the operation of the various switches during the appropriate periods of the various transmissions from the prime and secondary stations in the transmitting cycle. The phase-lock discriminator 50 receives a 100 kHz input continuously from the receiver but the appropriate reference signal is switched to the second input during the required periods and the output from the phase discriminator is selected only during the required periods to give the appropriate controls. In this particular embodiment, the phase-locked discriminator is made active during a 5 millisecond period which commences 10 milliseconds after the leading edge of the relevant 20 millisecond timing pulse. During the period of the $f1$ transmission from the change station, the phase-lock discriminator 50 locks the 10 MHz oscillator 51 in frequency and phase so that the 100 kHz output from the divider 52 corresponds in frequency and phase to the 100 kHz output from the shaper unit 49 subject however to the phase shift introduced by control 59. During the $f2$ transmissions from the prime station, the discriminator 50 locks the oscillator 53 so that the output of the divider 54 has the required phase relation with the received $f2$ signals. It will thus be seen that the local signal generator φ1.1. now stores the prime phase datum for the $f1$ transmissions. The oscillator 51 is now at the correct frequency and phase. It drives the heterodyne frequency synthesisers for the $f2$ and $f2$ transmissions from the secondary stations. It will be noted that any change in the frequency or phase of the oscillator 51 causes a corresponding change in the input to the mixer 45 and hence into the signal input to the phase discriminator 50 by an amount depending on the setting of the synthesiser. Any frequency or phase shift on the oscillator 51 will produce 100th of the frequency or phase change on the reference side of the discriminator 50 and thus the degree of control of the oscillator is reduced approximately in proportion to the ratio of the synthesiser frequency to 100 kHz. The analogue output from the discriminator 50 is applied via the lead 62 to the varactor control input of the oscillator 51 in such a sense as to pull the frequency in phase to that represented by the received $f1$ transmissions. In this way, over a few system cycles, frequency and phase of the phase datum memory oscillator 51 is ensured. In a similar way the discriminator 50 provides an analogue output on lead 63 to lock the 10 MHz oscillator 53 to the frequency and phase represented by the received $f2$ transmission. It will be noted in this case that any change in the frequency or phase of the oscillator 53 is applied only to the reference side of the discriminator 50 and not to the signal input side since the synthesiser 47 is driven by the oscillator 51.

When locking the $\phi1.1$ oscillator 51 the reference is 100 kHz derived from $\phi1.1$. That is, the incoming $f1.1$ transmission is heterodyned with a frequency synthesised from $\phi1.1$, and any difference between the 100 kHz i.f. and the 100 kHz derived from $\phi1.1$ generates a control output from the synchronising discriminator to correct frequency and phase of $\phi1.1$.

When locking phase memory oscillator $\phi1.2$ the reference is 100 kHz derived by heterodyning a frequency synthesized from phase memory oscillator $\phi1.1$ (already locked to $f1$ transmission) with the incoming $f2$ signal. This 100 kHz intermediate frequency is compared with 100 kHz derived from phase memory oscillator $\phi1.2$ and output from the phase-lock discriminator corrects the frequency and phase of $\phi1.2$.

It can be seen that in the case described for $\phi1.1$ the reference effectively is on the $\phi1.1$ side of the discriminator because the $\phi1.1$ oscillator is providing both 100 kHz to the discriminator and the synthesised heterodyne frequency for generating the i.f. In the case described for $\phi1.2$ the reference is on the received signal side of the discriminator because the heterodyne frequency is generated from phase memory oscillator $\phi1.1$, whose frequency and phase already have been locked.

At this stage each secondary station control unit has its timing locked to the stored $f1$ phase datum transmitted from the prime station. It also has stored a $f2$ phase datum. If the stations are all fixed, these phase data will be locked to the received transmissions, and stable. If a secondary station is moving, the stored data will be plus or minus the doppler generated by the vessel moving towards or away from the prime station. The same will apply if the prime station is moving and the secondary stations are fixed.

Once the timing control unit 72 has been synchronised, a switch 81 may be operated. This is effective to disconnect the feed from the synchronising discriminator 80 but only after reception of the next trigger pulse. The timing control unit 72 is now controlled by the 4 kHz input on lead 73 derived from the oscillator 51 via the synthesiser 46. The update of the timing is thus now dependent on the narrow band filtering to which the prime station signals are subject in the $\phi1.1$ control loop. In effect therefore the bandwidth for timing control purposes is narrowed with consequent improvement in the signal-to-noise ratio.

The phase discriminator 50 is also used to phase-lock the transmissions from the secondary with the stored signals in the memories $\phi1.1$ and $\phi1.2$. To do this, a synthesised F1 or F2 is heterodyned in the unit 70 with the 100 kHz signal from the appropriate one of the dividers 67, 69 to provide the $f1$ and $f2$ frequencies.

The synthesised heterodyne frequencies F1 and F2 are derived, using synthesisers 46, 47, from the transmission phase memory oscillator $\phi1.1$ which is locked to the prime station phase datum. The phase discriminator 50 serves to compare the phase of the transmitted signal during the secondary station transmission with a reference signal derived from the memory $\phi1.1$ or $\phi1.2$ as appropriate and to control the transmission oscillators 66, 68 to maintain the required phase relationship. It will be noted that any phase shift introduced by the phase shifter 58 is thus added in during the locking and is effective on the phase of the transmitted signals from the secondary station. The varactor-controlled oscillators 66, 68 are phase-locked by means of the analogue outputs on leads 64, 65 respectively from the discriminator in a similar manner to the oscillators 51, 53.

The matching unit 41 constitutes in effect an attenuator serving to apply to the receiving channel 43 a small proportion of the output from the power amplifier 42. Conveniently this unit 41 has a low impedance circuit between the antenna and the receiver channel including, in series, the contacts of a relay. During periods when the secondary station is transmitting, the relay contacts are opened and the capacitive impedance of the contacts forms a high impedance circuit connected between the antenna and the receiving channel. This high impedance is constituted by the capacitance of the contacts, typically of about half a picofarad, which will give a 90° phase shift substantially unaffected by temperature changes or by changes in frequency.

A single prime station can be used with up to 5 secondary stations employing a timing cycle as shown in FIG. 1. If fewer than 5 secondary stations are employed, the overall period of the timing cycle can readily be reduced as approriate. The transmissions on frequencies $f1$ and $f2$ may be made from separate stations. It will be noted that a prime station essentially used equipment which constitutes part of the equipment employed at a secondary station. The equipment may readily be made in modular form to facilitate assembly in various different combinations to form prime and secondary stations as required.

Figure 4A:
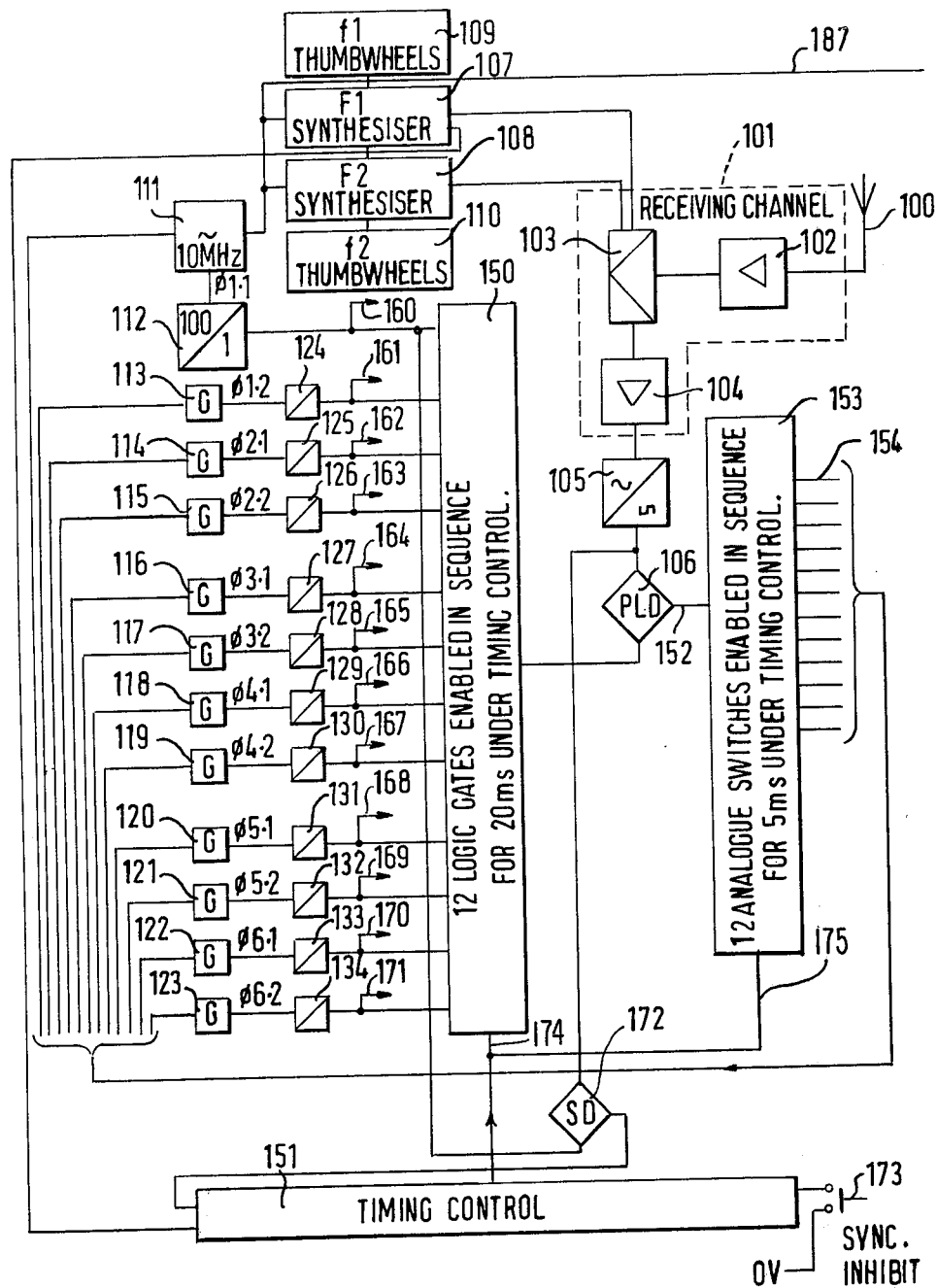

FIGS. 4A and 4B together illustrate the construction of one form of receiving equipment. This particular embodiment includes means for staticising up to 3 fine patterns on the frequency $f1$ selected out of any of those possible from a particular chain configuration. The display also provides for coarse positional information to be obtained utilising the $f2$ transmissions of the appropriate stations. The display is digital and typically provides a 6-digit readout with continuous display of the selected patterns in terms of whole and fraction lane counts. With a full complement of circuit boards, the receiver can memorise the received phase of all twelve possible chain transmissions and relate $f1$ and $f2$ of any station pair, in either station order, for each of the three displays. Position in patterns centred on base lines joining any pair of stations can be measured and displayed. An additional 2-digit readout with each position display gives receiver position in a difference pattern, that is to say a coarse pattern, derived by comparing the received phase of the $f1$ and $f2$ transmissions, from each selected station pair. A sequenced binary coded decimal output of the instantaneous values of each 6-digit readout together with the setting of the two related station selector switches is also available.

Referring to FIG. 4A there is a receiving antenna 100 connected to a receiving channel 101 comprising an amplifier 102, heterodyne mixer 103 and an output amplifier 104, leading to a squarer 105 providing one input of a phase-lock discriminator 106. The heterodyne signals are provided from two synthesisers 107, 108 forming the F1 and F2 synthesisers respectively which synthesisers can be set by be thumbwheel controls 109, 110 to the selected frequencies in steps of 100 Hz. The input signal for the synthesiser is obtained from a varactor-controlled 10 MHz oscillator 111 which oscillator with 100 to 1 divider 112 constitutes a prime station memory referred to hereinafter as the $\phi1.1$ memory. It will be immediately apparent that the receiver equipment described thus far is identical (apart from the absence of the matching unit 41) with the corresponding equipment in the secondary station control unit. For each received signal, the receiving station has an appropriate memory unit. In addition to the memory unit 111, 112 there are shown eleven further corresponding memory units each comprising a 10 MHz oscillator 113 to 123 with a 100 to 1 frequency divider 124–134. These units are referred to hereinafter as $\phi1.2$, $\phi2.1$ etc, the notation employed being that the first of the two figures indicates the transmitting station and the second of the two figures indicates the frequency. Thus $\phi3.2$ is the memory oscillator for the $f2$ transmission from station No. 3. The memory units all give outputs of nominally the same frequency but the phases will differ due to the doppler effect of differing rates of relative movement of the receiver with respect to the various transmitting stations.

The outputs from the twelve memory units are applied to 12 inputs of a gating circuit 150, the gates of which are controlled by a timing control unit 151 to be described later. At the appropriate time instants, the outputs from the various memory oscillators are applied as reference inputs to the aforementioned phase-lock discriminator 106. This discriminator thus compares the phase of the selected reference oscillator with the phase of the incoming received signals and provides an output on a lead 152 which is applied via a switching circuit 153 to the appropriate one of twelve output leads 154. The phase-lock discriminator 106 provides an analog output which changes in sequence as the various transmissions are received, each transmission being compared with the appropriate phase store. These analogue outputs are fed back by the switching circuit 153 to appropriate leads to control the oscillators of the phase stores so that, during the various transmissions, the appropriate oscillators 111 to 123 are phase-locked to the received transmissions. Thus signals locked in phase to the twelve received signals are now continuously available at a frequency of 100 kHz on the leads 160 to 171 from the various frequency dividers.

The stored phase memories include the necessary frequency shift to allow for the doppler effect due to relative movement between the receiver and transmitting stations. Thus, so long as there is no change in speed or direction of movement relative to the transmitting stations, the phase memories store information relating to instantaneous present position of the receiver, not merely past information at the various times at which the different phase memory oscillators were last compared in phase with received signals.

Synchronising of the timing is effected by a synchronising discriminator unit 172 which is similar to the discriminator unit 80 in the secondary transmitters and which senses the modulation on the synchronising transmission from the prime station to provide a reset signal for initiating the cycle of the timing control unit 151. This timing control unit provides the necessary signals at the appropriate times on leads 174, 175 for operating the gates of the units 150 and 153. A manually operable switch 173, when operated, disconnects the feed from the synchronising discriminator unit 172 but is effective only after the reception of the next trigger pulse. Thus, is the switch is operated, the timing control will receive the next trigger pulse from the synchronising discriminator unit 172 but, thereafter, the timing control depends on the phase locked $\phi1.1$ oscillator 111 via the synthesiser 107. Since the timing control unit 151 operates from a 4 kHz signal from synthesiser 107, which is derived from oscillator 111 locked to the prime station, where the timing is derived in the same way, once the timing unit has been synchronised it will continue to operate correctly and does not require synchronising during each timing cycle. Thus the synchronising discriminator need only be functional when the equipment is first switched on the receive signals from a chain of transmitting stations. Thereafter, the synchronising transmissions are not required and the switch 173 may be operated. The timing is now dependent on the narrow band filtering to which the signals are subject in the $\phi1.1$ control loop. In effect therefore the bandwidth of the receiver is reduced so far as timing control is concerned, with increase in the signal-to-noise ratio.

The outputs on the leads 160 to 171 are applied as appropriate to form the inputs of three identical digitiser and phase measurement units 180, 181 and 182. Each of these units includes a phase measuring circuit 183 and counter 184 for providing both fine and coarse pattern information in binary-coded decimal form together with manually operable selector switches for providing the appropriate inputs to the digital phase comparison means selected from the signals on leads 160 to 171. The phase measurement is conveniently effected using a double-D type bistable which gives the two phase time intervals, i.e. a first time interval using signals locked to $f1$ transmissions and a second time interval using signals locked to f2 transmissions from the same pair of stations. These intervals are measured by a pulse count of 10 MHz signals obtained from the oscillator 111 on a lead 187. Since the comparison signals are 100 kHz signals, the count is inherently in one hundredths of a lane. To provide for the coarse pattern display, the two pairs of the twelve possible inputs are selected to give measurements employing the same base line at the two frequencies $f1$ and $f2$. The f1 pattern phase measurement is fed via the comparator into a phase angle fraction display store. The comparator updates the store by the minimum number of bits that are required and provides steering and carry data for the display whole lane counter. The $f2$ pattern phase measurement also is stored. The complement of the $f2$ store is added to the $f1$ pattern store and this mathematically generates the difference in phase between the two signals which is fed to the coarse pattern display. The same two stations must be used for the $f1$ and $f2$ measurements in one digitiser so as to obtain the appropriate coarse pattern. The counts for the fine and coarse patterns are displayed on display units 186.

In this particular receiver, provision is made for setting in manually the lane reading counts for the three displays. Once these counts have been set in, the comparator will provide carry data for altering the display whole lane counter. For this operation there is provided a set push button 185 together with digit select thumbwheels 188 for the three displays. A digit set thumbwheel 189 selects the particular digit in the display which is to be set.

It will be noted that the receiver used only a single phase-lock discriminator 106 to effect all the required phase-locking of the various memory units. No phase shifters are provided between the memory units and the phase-lock discriminator 106 and thus the phase locking is effected with the same circuits for all the various memories so eliminating differential phase shift problems in the receiver.

No referencing of the receiver is required since all the signals are datumed with one discriminator.

The switching means on the displays enable any pair of stations to be selected as a base line for the phase comparison measurement. In particular, it is possible to select a pair of secondary stations as well as to compare signals from each secondary station with the prime station.

I claim:

1. In a phase comparison radio navigation system having a prime transmitting station and one or more secondary transmitting stations which are spaced apart and radiate phase-locked signals of the same frequency in a time-shared sequence; the provision at a secondary station of a single antenna, a receiver coupled to said antenna for receiving signals from the antenna, a transmitter coupled to said antenna for transmitting the secondary station signals, and oscillator to provide a prime signal phase memory, a phase discriminator arranged to compare the phase of the signal at the antenna with the output of said oscillator to provide a phase control signal, a phase controller connected to the phase discriminator output to be responsive to said phase control signal, timing control means providing timing signals, synchronising means arranged to synchronise the timing means with received signals from the prime station, and switching means controlled by said timing means in synchronism with the transmission from the prime station and from the secondary station at which the switching means are located, which switching means are operative, during periods of transmission from the prime station, to switch the phase controller to control the oscillator in accordance with the output of the phase discriminator so that the oscillator is phase-locked to the received signals, said switching means further being operative, during periods of transmission from the secondary station at which the switching means are located, to switch the phase controller to control the phase of the transmitted secondary signals at the antenna in accordance with the output of the phase discriminator.

2. A radio navigation as claimed in claim 1 wherein the signal source for the secondary transmissions includes a voltage controlled oscillator, referred to as the transmission oscillator, having a control signal input and wherein, for effecting the control of the phase of the transmitted secondary signals by utilising the output of the phase discriminator, said timing means is arranged, during the appropriate time periods, to control switch means for applying the discriminator output to said control signal input to control the frequency of the transmission oscillator.

3. A radio navigation system as claimed in claim 1 wherein the memory oscillator at the secondary station, referred to hereinafter as the prime phase memory oscillator, has a frequency very much greater than the radio frequencies employed.

4. A radio navigation system as claimed in claim 3 and operating at radio frequencies in a band of 1600 to 5000 kHz, wherein the prime phase memory oscillator operates at 10 MHz.

5. A radio navigation system as claimed in claim 3 wherein a divider is connected to said prime phase memory oscillator to divide down the oscillator frequency to a lower comparison frequency and wherein the phase discriminator circuit is connected to receive the divided down output as one comparison input signal, and wherein a frequency synthesiser is connected to said prime phase memory oscillator to derive, from said prime phase memory oscillator, a heterodyne signal, and wherein said receiver includes a mixer stage arranged to receive said heterodyne signal for changing the frequency of the signals from the antenna to the aforementioned comparison frequency.

6. A radio navigation system as claimed in claim 5 wherein the transmission oscillator operates at the same frequency as the phase memory oscillator, and wherein said transmitter includes frequency changing means arranged to combine the synthesiser output as a heterodyne signal with the transmission oscillator output to produce the required radiation frequency.

7. A radio navigation system as claimed in claim 6 wherein at least one further frequency synthesiser is arranged to provide at least one further different frequency which is a multiple of the aforementioned frequency step and which is derived from a single oscillator locked to received signals from the prime station and wherein the prime station and each of the secondary stations has such a further frequency synthesiser whereby all the stations of the system can transmit on at least two different frequencies.

8. A radio navigation system as claimed in claim 7 wherein the different frequency transmissions are radiated on a time-shared basis.

9. A radio navigation system as claimed in claim 8 wherein, at each secondary station, there is provided a separate phase memory oscillator for each further frequency radiated from the prime station in addition to the first frequency and wherein said timing means are arranged to switch the output of the aforesaid phase discriminator, during periods of transmission from the prime station on any further frequency, to control the appropriate further oscillator and, during transmissions from the secondary station on that further frequency, to control the radiated phase in accordance with a phase comparison in the phase discriminator of the appropriate further oscillator output with the transmitted signals at the antenna.

10. A radio navigation system as claimed in claim 9 wherein said further phase memory oscillators are arranged to operate at the same frequency as the first phase memory oscillator, apart from the different doppler shifts due to any relative movement between transmitting stations and wherein separate frequency synthesisers for each frequency, are each driven from the oscillator locked to the received signals from the prime station at the first frequency to provide the appropriate heterodyne inputs for heterodyning the signals from the antenna to give the required input frequency to the phase discriminator.

11. A radio navigation system as claimed in claim 9 wherein, in each secondary station, for transmitting signals of each frequency on a time-shared basis, there is provided a common power amplifier together with separate transmission oscillators for each frequency to be transmitted, which transmission oscillators are at the same frequencies as the aforementioned phase memory oscillators and a divider for each transmission oscillator together with a balanced modulator for combining the divider output with the output from the appropriate synthesiser to give the required radio frequency, the transmission oscillators being controlled by the output of the aforementioned phase discriminator during the appropriate time periods so as to provide the required phase control of the radiated signal.

12. A radio navigation system as claimed in claim 5 wherein a step adjustable phase shifter is arranged between the frequency divider and phase discriminator for altering in phase steps the phase of the input to the phase discriminator from the frequency divider for introducing phase shift into that input of the phase discriminator in steps corresponding to fractions of a cycle, said phase shifter being arranged so that the number of steps in the cycle corresponds to the divider ratio.

13. A radio navigation system as claimed in claim 12 wherein said frequency divider has a division ratio of 100:1.

14. A radio navigation system as claimed in claim 1 and having a power amplifier at each transmitting station, wherein, at each secondary station, a matching unit is provided coupling the power amplifier to the antenna, said matching unit being arranged to attenuate the input to the receiver during periods of transmission.

15. A radio navigation system as claimed in claim 14 wherein said matching unit includes a relay switched during periods of transmission to provide a high impedance in the circuit to the receiving channel.

* * * * *